US006266429B1

United States Patent
Lord et al.

(10) Patent No.: US 6,266,429 B1
(45) Date of Patent: Jul. 24, 2001

(54) METHOD FOR CONFIRMING THE INTEGRITY OF AN IMAGE TRANSMITTED WITH A LOSS

(75) Inventors: William P. Lord, Fishkill; Mohamed Abdel-Mottaleb, Ossining; Michael Epstein, Spring Valley, all of NY (US)

(73) Assignee: Philips Electronics North America Corporation, New York, NY (US)

( * ) Notice: Subject to any disclaimer, the term of this patent is extended or adjusted under 35 U.S.C. 154(b) by 0 days.

(21) Appl. No.: 09/159,288

(22) Filed: Sep. 23, 1998

(51) Int. Cl.⁷ ........................................................ H04L 9/00
(52) U.S. Cl. .................... 382/100; 382/244; 380/268; 713/186
(58) Field of Search ................................. 382/100, 232, 382/115, 224, 244; 714/719; 380/30, 28, 268; 348/700; 713/186

(56) References Cited

U.S. PATENT DOCUMENTS

| | | | |
|---|---|---|---|
| 4,369,465 | * | 1/1983 | Biamoutier et al. .................. 358/167 |
| 5,144,667 | * | 9/1992 | Pogue, Jr. et al. ...................... 380/45 |
| 5,153,918 | * | 10/1992 | Tuai ........................................ 380/25 |
| 5,465,353 | * | 11/1995 | Hull et al. ............................. 395/600 |
| 5,493,345 | * | 2/1996 | Ishikawa et al. ..................... 348/700 |
| 5,499,294 | | 3/1996 | Friedman ................................ 380/10 |
| 5,768,426 | * | 6/1998 | Rhoads ................................. 382/232 |
| 5,799,088 | * | 8/1998 | Raike ..................................... 380/30 |
| 5,832,119 | * | 11/1998 | Rhoads ................................. 382/232 |
| 5,857,025 | * | 1/1999 | Anderson et al. ..................... 380/28 |
| 5,859,920 | * | 1/1999 | Daly et al. ............................ 382/115 |
| 5,955,717 | * | 9/1999 | Vanstone ............................... 235/380 |
| 5,960,081 | * | 9/1999 | Vynne et al. ........................... 380/10 |
| 5,982,891 | * | 11/1999 | Ginter et al. ............................. 380/4 |
| 5,982,932 | * | 11/1999 | Prokoski ............................... 382/224 |
| 5,987,634 | * | 11/1999 | Behrens et al. ....................... 714/719 |
| 6,028,937 | * | 2/2000 | Tatebayashi et al. .................. 380/25 |
| 6,049,611 | * | 4/2000 | Tatebayashi et al. .................. 380/44 |

OTHER PUBLICATIONS

"A Robust Image Authentication Algorithm Distinguishing JPEG Compression from Malicious Manipulations", by Ching–Yung Lin et al, published in ISLT/SPIE Symposium on Electronic Imaging: Science and Technology, Jan. 1998, San Jose, CA, pp. 77–80.

* cited by examiner

Primary Examiner—Leo Boudreau
Assistant Examiner—M B Choobin

(57) ABSTRACT

A digital image is divided into a plurality of cells having a first sequence. A random seed is generated and used to produce two sets of pseudo-random numbers. The first set of pseudo-random numbers are used to alter the location and shape of the cells thereby creating a new set of cells that the image is divided into. A measurement is taken for each of these new cells. The second set of pseudo-random numbers creates a second sequence. Each of the new cells corresponding to the first sequence is compared to another new cell corresponding to the second sequence. This comparison is related to a threshold and yields a fingerprint. The resultant fingerprint is transmitted along with the image and the random seed. A receiver performs the same algorithm on its received image. If it produces the same fingerprint as the one it receives, it is assumed that the image has not been altered.

25 Claims, 4 Drawing Sheets

$n^2$ CELLS

METHOD FOR CONFIRMING THE INTEGRITY OF AN IMAGE TRANSMITTED WITH A LOSS

BACKGROUND OF THE INVENTION

The present invention relates generally to the field of signal encryption and more specifically, to a method for identifying whether digital images, transmitted with a loss, have been unaltered and have been sent from a specific source. This is accomplished through the creation of a specialized fingerprint and "signature".

Methods exist for encrypting digital signals to prevent tampering such as disclosed in U.S. Pat. No. 5,499,294, keep a malicious adversary from altering the signal. A fingerprint or "hash" is taken of the digital image. Hashing algorithms (i.e. one-way functions) are well known and easy to calculate but very difficult to mathematically invert. The fingerprint is typically encrypted with an encryption key to prove or authenticate the creator of the signature. The encryption itself is a standard public/private key cryptology with the source station utilizing a private key. The resulting signature can be decrypted by a receiving station with the source's public key.

The hash-key combination along with the original image, is then sent to the receiving station which uses the public key of the presumed transmitter in decrypting the encrypted hash. The receiving station performs the same hash algorithm on the received image and compares it to the decrypted hash. If these two hashes are identical, there has been no noise in the transmission and the image has not been modified (tampered) by a third party. If the image was modified or the wrong public key is used, the two hashes will not be identical.

The same technique would generally not work in a transmission where information is lost. Generally, a digitized version of a received image includes lost bits or noise which corrupt the received digitized image. Consequently, it is difficult to confirm whether a received image has been tampered with based upon a comparison of the received fingerprint of the source image to a digitized fingerprint generated based on the received digitized image.

Another attempt to solve the problem in a JPEG transmission is described in "A Robust Image Authentication Algorithm Distinguishing JPEG Compression from Malicious Manipulations" by Ching-Yun Lin and Shih-Fu Chang, published in ISLT/SPIE Symposium on Electronic Imaging: Science and Technology, Jan 1998, San Jose, Calif. pages 77–80. Their method is to compare the same block in subsequent frames of a JPEG compressed transmission. This comparison is performed to ensure the range of difference in value between these two blocks remains the same ever after compression and decompression is performed. A signature is created by comparing the difference between two blocks and a threshold. A binary "0" or "1" is entered into the signature depending on whether the difference is above or below that threshold. This signature is sent along with the transmitted image and the method continues as discussed above.

The Lin/Chang method is deficient in that it relies on the inherent structure of JPEG compression and would not work with other transmissions (including lossy transmissions) which do not follow the JPEG format. Further, The Lin/Chang method allows the possibility of tampering. Since the signature is completely based upon a comparison of consecutive frames with a threshold, a malicious adversary could create a completely different data stream and send it to the receiver as long as the differences between consecutive frames is approximately (within the range of the chosen threshold) the same.

Still another technique known in the art is watermarking. A set of bits (a mark) is added to a transmitted image. This mark should be complete enough so that it can be detected by a receiver but should not alter the nature of image. The technique is often used in copyright situations where piracy is a concern. A defendant who alleges he did not copy the image will then be forced to explain why the watermark is still within the image. Watermarking is an efficient way of proving origination. However, it does not indicate when tampering has occurred.

Therefore, it is desirable to provide an improved method for confirming whether a received image has been altered. The method should include a fingerprint which is simple to compute from the image but difficult to create an image that has a given fingerprint. The fingerprint method also should have the characteristic that it would be difficult to generate two images that have the same fingerprint. The fingerprint method should be operable when losses are experienced through transmission of the digitized signal.

OBJECTS AND SUMMARY OF THE INVENTION

One aspect of the invention is a method for confirming the integrity of a transmitted image including the steps of dividing the image into a first plurality of cells having a first sequence, generating a random seed and generating a first plurality of pseudo random numbers based upon said random seed. The method further includes the steps of creating the image into a second plurality of cells based upon the first plurality of pseudo random numbers and the first plurality of cells and generating a second plurality of pseudo random numbers, the second plurality of pseudo random numbers forming a second sequence. The method also includes the steps of comparing cells corresponding to the first sequence with cells corresponding to the second sequence, in forming a first fingerprint, and transmitting the fingerprint, the image, and the random seed to a receiver. The method still further includes the steps of producing a second fingerprint, by the receiver, using the image and the random seed that was received, and comparing the first and second fingerprints.

This method makes it difficult for a third party to manipulate an image without changing the fingerprint of that image. The fingerprint itself is easy to create if one knows the seed. But, this seed will be unknown by a third party. Even though the image will be sent with losses, the fingerprint will not change and so it still can be used to monitor the integrity of the image.

Another aspect of the present invention is a method for creating a fingerprint of an image including the steps of dividing the image into a first plurality of cells having a first sequence, generating a random seed, generating a first plurality of pseudo random numbers based upon the random seed, and dividing the image into a second plurality of cells based upon the first plurality of pseudo random numbers and the first plurality of cells. The method also includes the steps of generating a second plurality of pseudo random numbers, the second plurality of pseudo random numbers forming a second sequence, and comparing cells corresponding to the first sequence with cells corresponding to the second sequence, in forming the fingerprint. This fingerprint has the same benefits as the fingerprint state above.

In yet another aspect of the invention a computer readable storage medium includes a fingerprint representing an image, the medium has a series of representations, each representation resulting from a comparison between a threshold and a difference between a first number and a second number. The first number corresponds to a value of a first cell of a first plurality of cells of the image. The second number corresponds to a value of a second cell of a second plurality of cells of the image. The first plurality of cells is formed by dividing the image into a third plurality of cells and manipulating the third plurality of cells based upon a first plurality of pseudo random numbers. The second plurality of cells are equal in number to said first plurality of cells and have a sequence dictated by said second plurality of pseudo random numbers.

In still yet another aspect of the present invention, a computer readable storage medium has encoded data for dividing an image into a first plurality of cells having a first sequence, generating a random seed, and generating a first plurality of pseudo random numbers based upon the random seed. The medium further has data for creating the image into a second plurality of cells based upon the first plurality of pseudo random numbers and the first plurality of cells, generating a second plurality of pseudo random numbers, the second plurality of pseudo random numbers forming a second sequence, and comparing cells corresponding to the first sequence with cell corresponding to the second sequence, in forming a fingerprint.

It is an object of the invention to provide a method for verifying the source and integrity of an image transmitted with a loss.

It is another object of the present invention to provide a signature of a digital image that is unique, easily produced, and capable of comparison with another signature even after being transmitted with loss.

These and other objects will become apparent from the following disclosure with continuing reference to the drawings where like reference numerals refer to the same element.

DETAILED DESCRIPTION OF THE PREFERRED EMBODIMENT(S)

Figure 1:
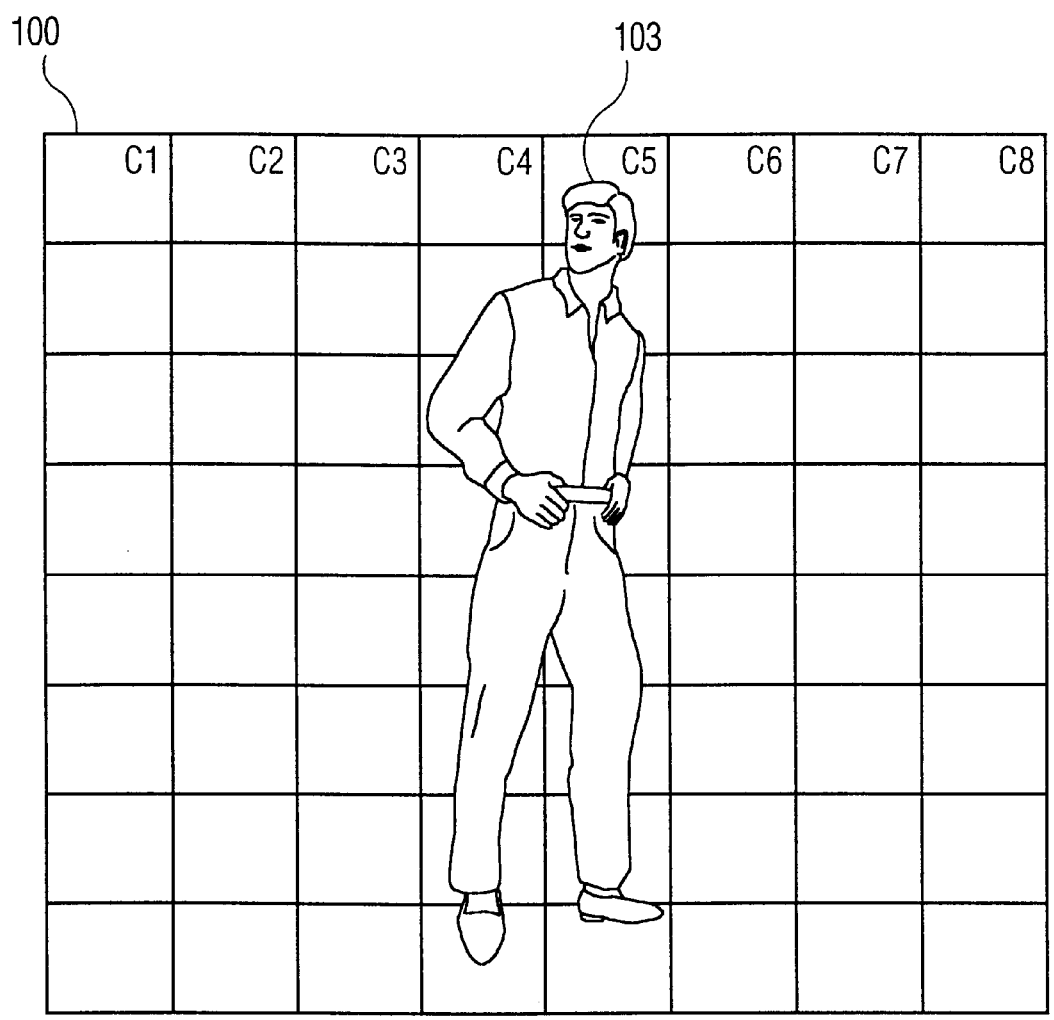
FIG. 1 is a diagram showing the division and ordering of cells of an image to be transmitted according to the invention.
Figure 4:
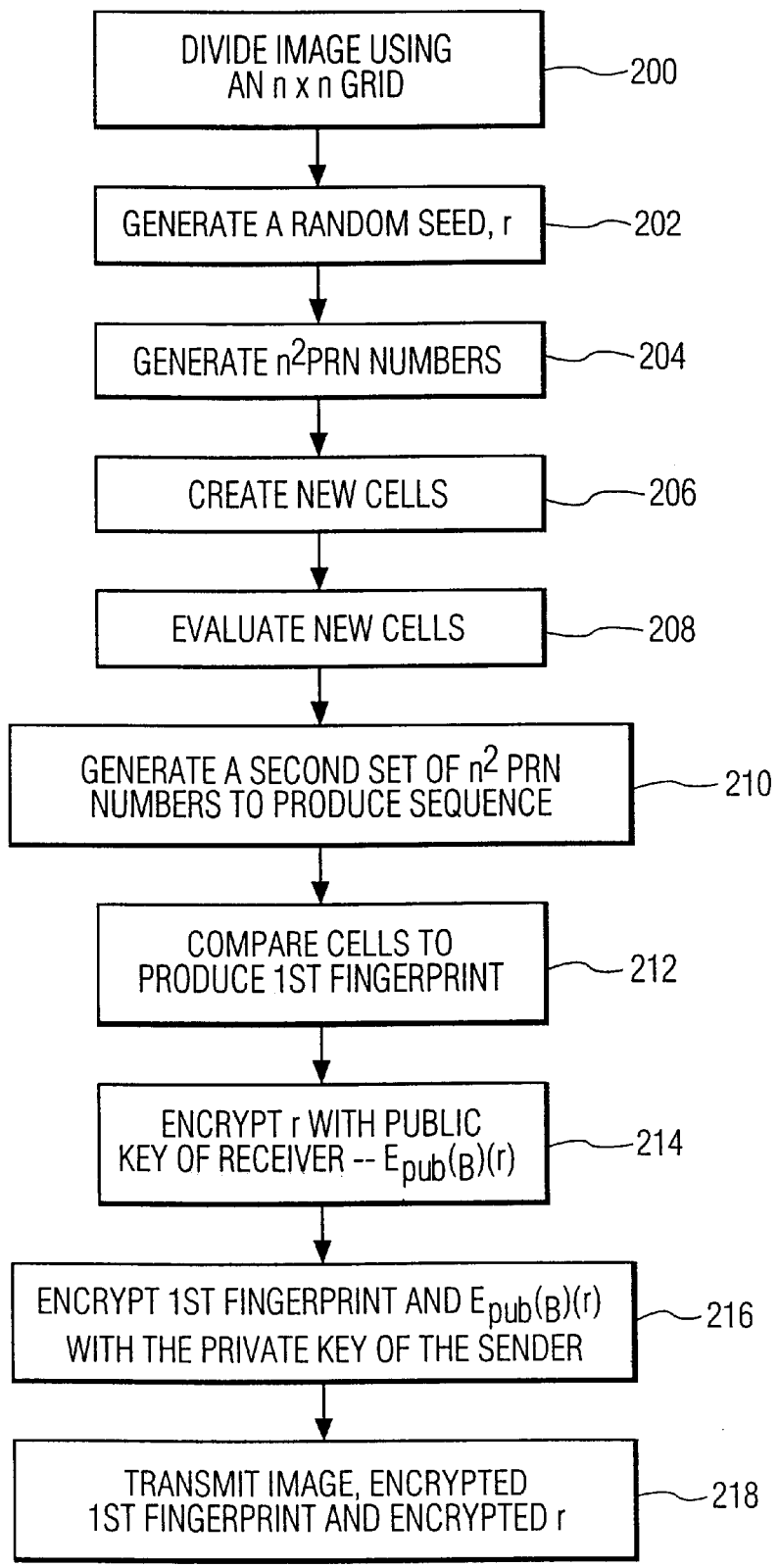
FIG. 4 is a flow chart of a method for generation of a signal to be transmitted representing, in part, the image and fingerprint of FIG. 3.

Referring to FIGS. 1 and 4, a n x n grid 100 is applied to a source digital image 103 thereby creating $n^2$ cells under step 200. The value of n depends upon the processing power and probability of accuracy desired. The $n^2$ cells are numbered ($C1, C2, C3 \ldots Cn^2$) in accordance with any suitable numbering system desired. Under step 202, a random seed "r" is generated. The best way to make this random seed is from a source in nature. For example, electrical noise, radioactive decay, or cosmic rays from the sun. Anything unpredictable that can not be altered easily would form an optimal source. At step 204, using r as a seed, $n^2$ pseudo-random numbers (prn) are generated. A boundary must be imposed on the prn values because of the displacement caused by these numbers (as will be explained in more detail below) These numbers are calculated using a mathematical algorithm applied to random number r. Any algorithm could be used. Although the algorithm may eventually be determined, random seed r can not be easily learned.

Figure 2:
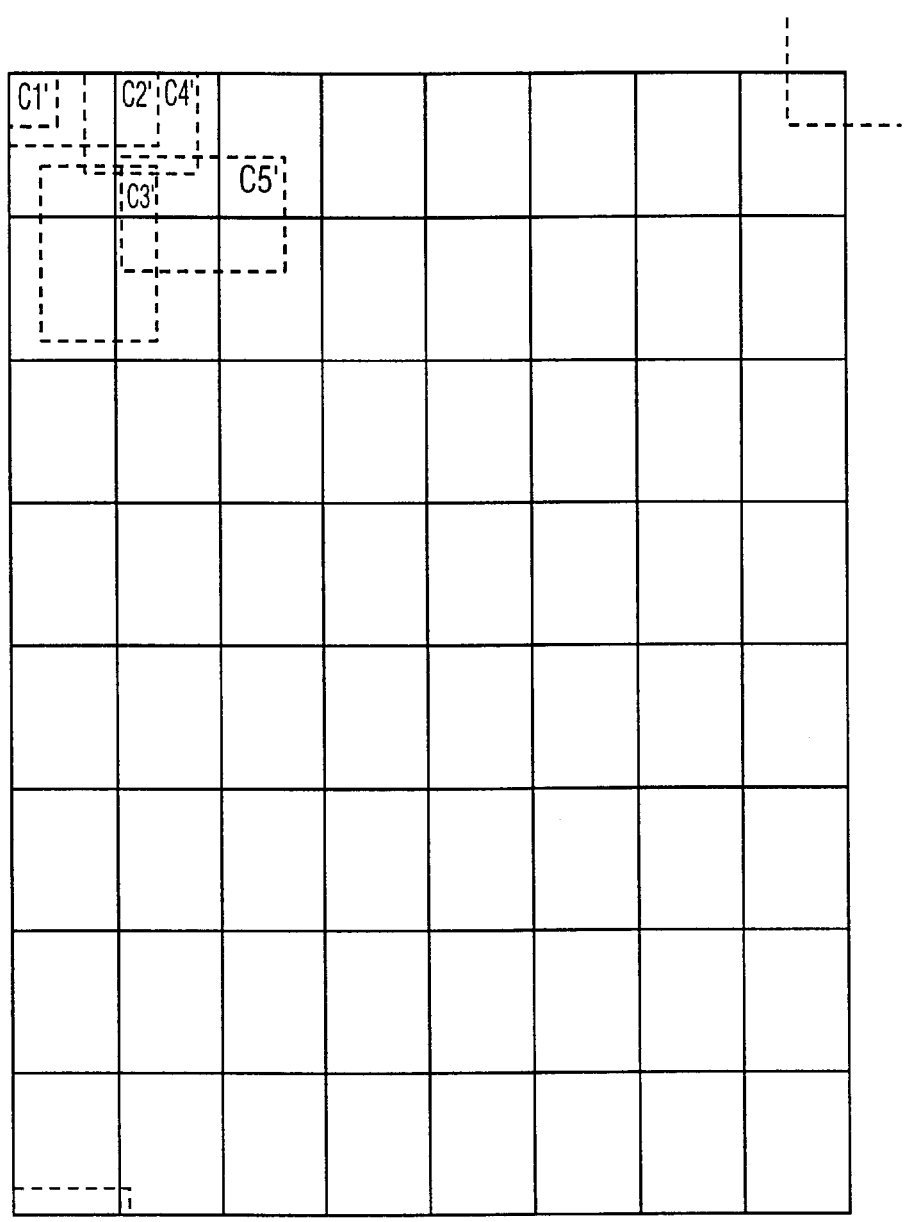
FIG. 2 is a diagram showing newly created cells in accordance with the invention.

Referring now to FIG. 2, under step 206 each cell ($C1, C2, C3 \ldots Cn^2$) is then manipulated (i.e. displayed and scaled) as a result of its respective prn. For example, each cell could be displaced from its origin by the prn and then the width and height changed by the same amount (or by a different amounts generated by multiple prns) as the displacement. If displacement causes a cell to go beyond the original image's boundaries, the cell wraps around to the other side as shown in FIG. 2. As is evident, many cells now overlap. The size and location of these new cells ($C1', C2', C3' \ldots Cn^{2'}$) is unknown to a third party.

Prior art fingerprints produced an evaluation metric for each cell thereby creating a corresponding value. Many techniques could be used to find this metric. For example, the measure could be the amount of a particular color in each cell, a sum of the values of the pixels, or a discrete cosine transform ("DCT"). In these prior art fingerprints, as was stated above, a third party could easily create a different image that would have the same fingerprint. If green were the variable, for example, a third party would merely have to produce cells which have the same amount of green in them. However, if a third party attempted to recreate an image with the fingerprint of the present invention, he would interface with multiple overlapping cells.

At step 208, for each of these newly created cells, an evaluation metric is taken for each resulting area of the image. The actual measure used is not important and any of the prior art techniques could be implemented. Experimentation has found that if a DCT is used only the DC value is necessary; the AC values do not significantly contribute to the calculation. An assortment of techniques could be available and chosen by a user or randomly chosen using the pseudo-random numbers described above. This assortment of techniques could also be combined together to form one large signature. The goal is to make a signature so that it would be difficult for a third party to create a different image with the same signature.

Under step 210, a second set of $n^2$ pseudo-random numbers is created. These number represent a sequence to be applied to the newly generated cells. The first number in the sequence is the cell number that is compared with cell 1, the second number is the cell number compared with cell 2, and the $n^2$ number is the cell number compared with cell $n^2$. For example, if the second set of prns started with 14, 23, 5 . . . , then cell 14 would be compared with cell 1, cell 23 with cell 2 and so on. The comparison is the relation of the metric values that were determined above.

Figure 3:
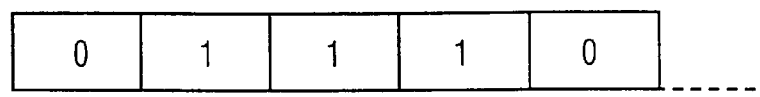
FIG. 3 is a diagram of a representative fingerprint in accordance with the invention.

At step 212, a fingerprint is created by comparing the relationship between the pairs to a threshold. If the difference between a pair is above the threshold, a "1" is entered into the fingerprint. Otherwise, a "0" is entered. Each pair thus produces one bit of a fingerprint that is $n^2$ bits long. An example of a fingerprint is shown in FIG. 3. The fingerprint could be stored on any storage medium or can be transmitted immediately.

For transmission from a transmitter A to a receiver B, random seed r is encrypted with the public key of the receiver—$E_{pub(b)}(r)$ under step 214. The fingerprint is then appended to $E_{pub(b)}(r)$. Finally, the $E_{pub(b)}(r)$ and fingerprint combination are encrypted with the private key of the sender and sent—$E_{pri(a)}[E_{pub(b)}(r)$ and fingerprint] under steps 216 and 218. Clearly, the $E_{pub(b)}(r)$ does not have to be encrypted with the A private key. But, if not, at least the fingerprint would require the private key of A so that origination at A could be verified.

Both the fingerprint and the image are sent. The image is sent in the same way as it would have been. As for the fingerprint, even analog transmissions still alot for digital data that can be sent with some loss. For example, if an NTSC standard is used, digital data may be sent during the vertical blanking interval (VBI). In NTSC, pixels are illuminated horizontally, row by row. When the last pixel is energized, a finite period of time is required to traverse back to the beginning of the screen. During this time, called the VBI, digital data can be received. Other similar periods exist in equivalent standards.

Figure 5:
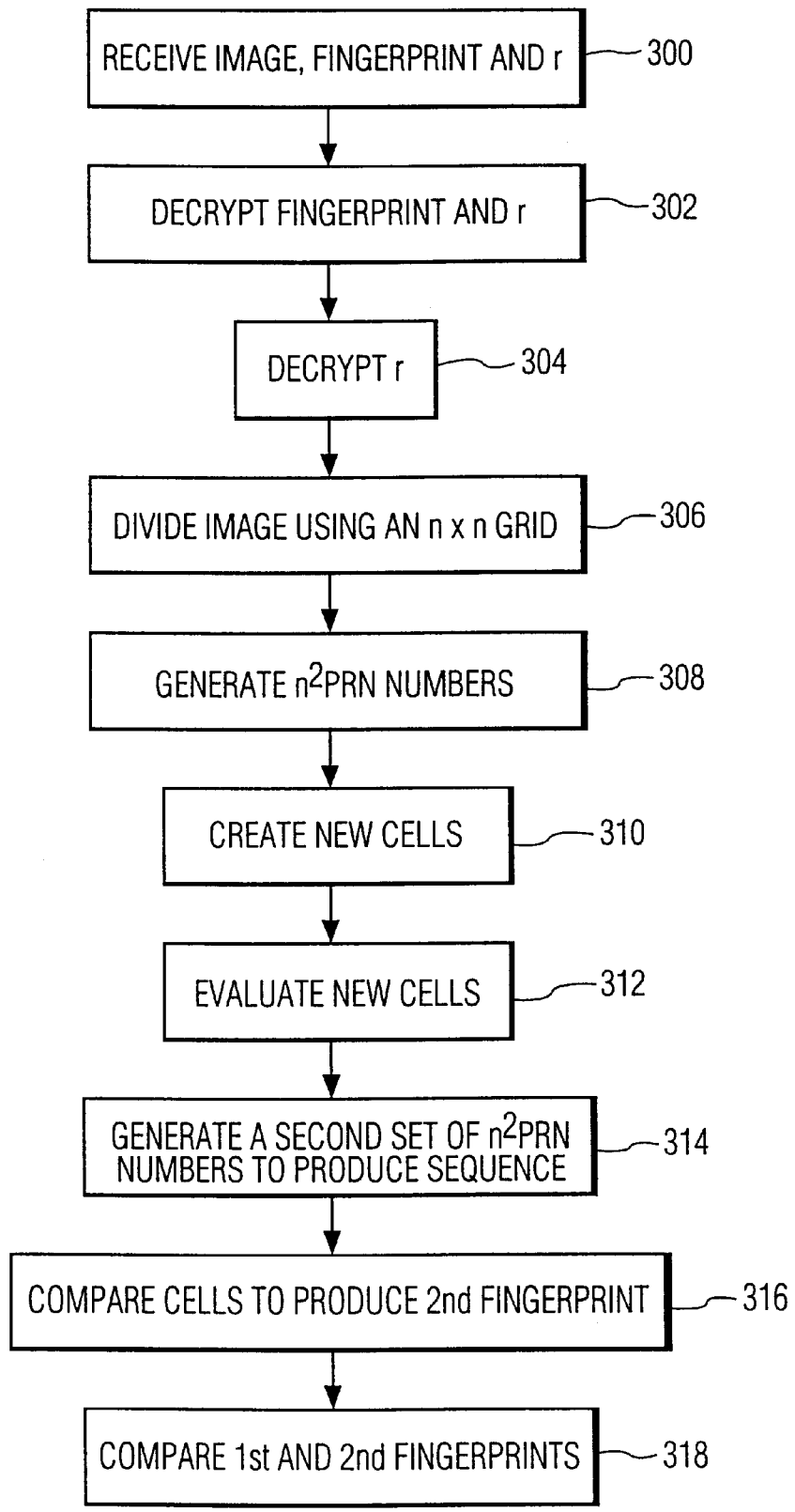
FIG. 5 is a flow chart of a method for receiving a transmitted image and fingerprint of FIG. 3 and for confirming the integrity of that image.

Referring to FIG. 5, on the receiving side B, the image and fingerprint are decrypted using A's public key. The result will nonsensical if any other source but A sent the message. If the wrong public key is used (for example a third station C), the result will also not make sense. The receiver now has the signature and E(r) and uses its own private key to obtain r. Receiver B performs the same steps on the image it received as A performed previously. Those steps include: dividing the image into an n-by-n grid, generating pseudo-numbers, etc. This will also produce a fingerprint of the image received. The receiving station compares this generated fingerprint with the fingerprint received. These two fingerprints should be the same. The comparison could be in real time or the fingerprints could be stored and compared later. Even though there is loss in the transmission, that loss should not affect the fingerprint so much that it will significantly change.

Some difference in the signatures could be allowed in order to compensate for noise in the transmission. For example the two fingerprints could be compared and the differences between them (the number of 0s and 1s that do not match) could be acceptable if below a threshold ("Hamming" distance). Even allotting for some bits in the fingerprints being different would not affect the security of the system because tampering would cause many bits in a fingerprint to flip; noise should only cause a few changes.

Clearly, all of the above variables can be modified without affecting the inherent nature of the algorithm. For example, the number of cells created, n, could be increased or decreased depending upon the security desired by a user.

The foregoing discloses an enhanced way for confirming the integrity and authenticity of a transmitted signal. The invention produces at least four cognizable results which optimizes the operation of the system: 1) the size of each cell used is unknown by a third party. This is protected by the prns which are produced by an unknown random seed. The actual sizing and scaling algorithm could be also be secret. 2) A third party does not know which cells are compared. This also a function of an unknown random variable. 3) The location of the cells is unknown as they are also a function of the generated random variable. 4) The algorithm or evaluation metric used to evaluate each cell is unknown. As stated above, the metric used could be a function of the prns as well.

For an additional element of security, a time stamp could be added to the transmitted signal. A malicious third party may be able to access the image and then send a delayed image to the receiver thereby transmitting an acceptable image and fingerprint. A time stamp would avoid this problem because the time would now also be included in the transmission. This stamp would be encrypted and sent to the receiver along with r, the computed fingerprint, and the image.

Clearly the exact order of the steps shown above need not be followed. For example, all the pseudo-random numbers could be created at the same time even before the n by n grid is applied.

As can now be readily appreciated, the invention, through the creation of a specialized fingerprint, thereby allows a evaluation to be made as to whether a transmitted image is unaltered, even when there was loss in the transmission.

Having described the preferred embodiments it should be made apparent to those skilled in the art that various changes may be made without departing from the scope or spirit of the invention as is defined more clearly in the appended claims.

What is claimed is:

1. A method for confirming the integrity of a transmitted digital image comprising the following steps:

dividing said image into a first plurality of cells having a first sequence;

generating a random seed;

generating a first plurality of pseudo random numbers based upon said random seed;

creating said image into a second plurality of cells based upon said first plurality of pseudo random numbers and said first plurality of cells;

generating a second plurality of pseudo random numbers, said second plurality of pseudo random numbers forming a second sequence;

comparing cells corresponding to said first sequence with cells corresponding to said second sequence, in forming a first fingerprint;

transmitting said fingerprint, said image, and random seed to a receiver;

producing a second fingerprint, by said receiver, using said image and said random seed that was received; and comparing said first and second fingerprints.

2. The method of claim 1 wherein said step of transmitting comprises the steps of:

encrypting said random seed with a public key of said receiver thereby producing an encrypted seed; and encrypting said first fingerprint and said encrypted seed with a private key of said transmitter.

3. The method of claim 1 further comprising the steps of:

generating a time stamp; and transmitting said time stamp to said receiver.

4. The method of claim 1 wherein said step of dividing comprises moving and scaling said first plurality of cells.

5. A security system using the method of claim 1.

6. The method of claim 1 wherein said first plurality of cells is equal in number to said first plurality of pseudo random numbers and equal in number to said second plurality of pseudo random numbers.

7. The method of claim 1 wherein said second fingerprint is formed in the same way as said first fingerprint.

8. The method of claim 1 wherein said step of comparing the cells including evaluating each cell using a plurality of evaluation metrics.

9. The method of claim 1 wherein said step of comparing the cells includes evaluating each cell using an evaluation metric chosen from a plurality of evaluation metrics, said choice being dictated by at least one of said first and second plurality of pseudo random numbers.

10. A method for creating a fingerprint of an image comprising the steps of:
- dividing said image into a first plurality of cells having a first sequence;
- generating a random seed;
- generating a first plurality of pseudo random numbers based upon said random seed;
- dividing said image into a second plurality of cells based upon said first plurality of pseudo random numbers and said first plurality of cells;
- generating a second plurality of pseudo random numbers, said second plurality of pseudo random numbers forming a second sequence; and
- comparing cells corresponding to said first sequence with cells corresponding to said second sequence, in forming said fingerprint.

11. The method of claim 10 wherein said step of dividing said image into a second plurality of cells comprises moving and scaling said first plurality of cells.

12. The method of claim 10 wherein said first plurality of cells is equal in number to said first plurality of pseudo random numbers and equal to said second plurality of pseudo random numbers.

13. A security system using the method of claim 10.

14. The method of claim 10 wherein said step of comparing includes evaluating each cell using a plurality of evaluation metrics.

15. The method of claim 10 wherein said step of comparing includes evaluating each cell using an evaluation metric chosen from a plurality of evaluation metrics, said choice being dictated by at least one of said first and second plurality of pseudo random numbers.

16. A computer readable storage medium including a fingerprint representing an image, said fingerprint comprising:
- a series of representations, each said representation resulting from a comparison between a threshold and a difference between a first number and a second number;
- said first number corresponding to a value of a first cell of a first plurality of cells of said image;
- said second number corresponding to a value of a second cell of a second plurality of cells of said image;
- said first plurality of cells being formed by dividing said image into a third plurality of cells and manipulating said third plurality of cells based upon a first plurality of pseudo random numbers; and
- said second plurality of cells being equal in number to said first plurality of cells and having a sequence dictated by said second plurality of pseudo random numbers.

17. The computer readable storage medium as claimed in claim 16 further comprising a time stamp.

18. The computer readable storage medium as claimed in claim 16 wherein said manipulating of said third plurality of cells includes moving and scaling said third plurality of cells.

19. The computer readable storage medium as claimed in claim 16 wherein said values are determined by using a plurality of evaluation metrics.

20. The computer readable storage medium as claimed in claim 16 wherein said values are determined by using an evaluation metrics chosen from a plurality of evaluation metrics, said choice being dictated by at least one of said first and second plurality of pseudo random numbers.

21. A computer readable storage medium having encoded data for performing the following steps on an image;
- dividing said image into a first plurality of cells having a first sequence;
- generating a random seed;
- generating a first plurality of pseudo random numbers based upon said random seed;
- creating and image into a second plurality of cells based upon said first plurality of pseudo random numbers and said first plurality of cells;
- generating a second plurality of pseudo random numbers, said second plurality of pseudo random numbers forming a second sequence;
- comparing cells corresponding to said first sequence will cells corresponding to said second sequence, in forming a fingerprint.

22. The computer readable storage medium of claim 21 wherein said step of dividing said image into a second plurality of cells comprises moving and scaling said first plurality of cells.

23. A security system using the computer readable storage medium of claim 21.

24. The method of claim 21 wherein said step of comparing includes evaluating each cell using a plurality of evaluation metrics.

25. The method of claim 21 wherein said step of comparing includes evaluating each cell using an evaluation metric chosen from a plurality of evaluation metrics, said choice being dictated by at least one of said first and second plurality of pseudo random numbers.

* * * * *